`US010427940B2`

United States Patent
Cummings

(10) Patent No.: US 10,427,940 B2
(45) Date of Patent: *Oct. 1, 2019

(54) APATITE PRETREATMENT

(71) Applicant: Bio-Rad Laboratories, Inc., Hercules, CA (US)

(72) Inventor: Larry Cummings, Pleasant Hill, CA (US)

(73) Assignee: BIO-RAD LABORATORIES, INC., Hercules, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,958

(22) Filed: Sep. 29, 2017

(65) Prior Publication Data

US 2018/0022608 A1 Jan. 25, 2018

Related U.S. Application Data

(63) Continuation of application No. 14/747,181, filed on Jun. 23, 2015, now Pat. No. 9,802,822.

(60) Provisional application No. 62/151,882, filed on Apr. 23, 2015, provisional application No. 62/082,017, filed on Nov. 19, 2014, provisional application No. 62/015,894, filed on Jun. 23, 2014.

(51) Int. Cl.
| | | |
|---|---|---|
| *C01B 25/32* | (2006.01) | |
| *B01D 15/20* | (2006.01) | |
| *B01D 15/38* | (2006.01) | |
| *B01J 20/281* | (2006.01) | |
| *B01J 20/04* | (2006.01) | |

(52) U.S. Cl.
CPC ............ *C01B 25/32* (2013.01); *B01D 15/203* (2013.01); *B01D 15/3847* (2013.01); *B01J 20/048* (2013.01); *B01J 20/281* (2013.01)

(58) Field of Classification Search
CPC .............. B01D 15/203; B01D 15/3847; B01D 15/424; B01J 20/048; B01J 20/281; B01J 20/282
See application file for complete search history.

(56) References Cited

U.S. PATENT DOCUMENTS

| | | |
|---|---|---|
| 3,737,516 A | 6/1973 | Jenner |
| 4,053,561 A | 10/1977 | Irani |
| 4,859,342 A | 8/1989 | Shirasawa et al. |
| 5,332,503 A | 7/1994 | Lee et al. |
| 5,744,587 A | 4/1998 | Alaska et al. |
| 5,783,217 A | 7/1998 | Lee et al. |
| 6,156,178 A | 12/2000 | Mansfield et al. |
| 6,602,697 B1 | 8/2003 | Cook, III |
| 6,972,090 B2 | 12/2005 | Boschetti et al. |
| 7,122,641 B2 | 10/2006 | Vedantham et al. |
| 7,476,722 B2 | 1/2009 | Vedantham et al. |
| 7,659,373 B2 | 2/2010 | Burg et al. |
| 7,767,447 B2 | 8/2010 | Breidenthal et al. |
| 8,058,407 B2 | 11/2011 | Sun et al. |
| 8,067,182 B2 | 11/2011 | Kelley et al. |
| 8,895,707 B2 | 11/2014 | Cummings |
| 8,951,807 B2 | 2/2015 | Cummings et al. |
| 9,592,540 B2 * | 3/2017 | Cummings .......... B01D 15/203 |
| 9,737,829 B2 * | 8/2017 | Cummings .......... B01D 15/203 |
| 9,802,822 B2 * | 10/2017 | Cummings ............. C01B 25/32 |
| 10,092,857 B2 * | 10/2018 | Cummings .......... B01D 15/203 |
| 10,099,157 B2 * | 10/2018 | Snyder ................ B01D 15/203 |
| 2004/0254267 A1 | 12/2004 | Nagae |
| 2004/0265298 A1 | 12/2004 | Lin |
| 2005/0107594 A1 | 5/2005 | Sun et al. |
| 2005/0209100 A1 | 9/2005 | Duval et al. |
| 2006/0246544 A1 | 11/2006 | Kang et al. |
| 2007/0060741 A1 | 3/2007 | Kelley et al. |
| 2009/0047723 A1 | 2/2009 | Jensen et al. |
| 2009/0186396 A1 | 7/2009 | Gagnon |
| 2009/0187005 A1 | 7/2009 | Gagnon |
| 2009/0264651 A1 | 10/2009 | Daly |
| 2009/0318674 A1 | 12/2009 | Gagnon |
| 2010/0113751 A1 | 5/2010 | Sun et al. |
| 2010/0291059 A1 | 11/2010 | Sakuraba et al. |
| 2011/0178276 A1 | 7/2011 | Cummings et al. |
| 2012/0149636 A1 | 6/2012 | Kraynov et al. |
| 2012/0172299 A1 | 7/2012 | Schmalz et al. |
| 2012/0192901 A1 | 8/2012 | Cummings |
| 2013/0323812 A1 | 12/2013 | Cummings et al. |
| 2015/0367252 A1 | 12/2015 | Snyder et al. |

FOREIGN PATENT DOCUMENTS

| | | |
|---|---|---|
| EP | 0256836 A1 | 2/1988 |
| EP | 1081221 A1 | 3/2001 |
| EP | 2138505 B1 | 8/2014 |
| WO | 03/059935 A2 | 7/2003 |

(Continued)

OTHER PUBLICATIONS

U.S. Appl. No. 13/006,022, filed Jan. 13, 2011, Issued.
U.S. Appl. No. 13/205,354, filed Aug. 8, 2011, Issued.
U.S. Appl. No. 13/891,502, filed May 10, 2013, Pending.
U.S. Appl. No. 14/598,719, filed Jan. 16, 2015, Issued.
U.S. Appl. No. 14/747,162, filed Jun. 23, 2015, Pending.
U.S. Appl. No. 14/747,221, filed Jun. 23, 2015, Pending.
U.S. Appl. No. 14/932,080, filed Nov. 4, 2015, Pending.
Bankston et al. "pH Transients in hydroxyapatite chromatography columns—Experimental evidence and phenomological modeling", Journal of Chromatography A, 1217 (2010) 2123-2131.
Britsch, "Purification of Flavanone 3 beta-Hydroxylase from *Petunia hybrida*: Antibody preparation and Characterization of a Chemogenetically Defined Mutant" *Archives of Biochemistry and Biophysics*, 276(2):348-354 (1990).
CHT Ceramic Hydroxyapatite: Instruction Manual, 16 pages (2001) http://www.bio-rad.com/cmc_upload/0/000/039/227/Lit-611d.pdf.

(Continued)

*Primary Examiner* — Shafiqul Haq
(74) *Attorney, Agent, or Firm* — Kilpatrick, Townsend and Stockton LLP

(57) ABSTRACT

Apatite pretreatment methods are provided. The method is applied to the apatite solid surface prior to first chromatographic use. In one embodiment, the method may be achieved by contacting an apatite solid surface with a phosphate buffered solution at a pH of at least about 6.5 and contacting the apatite solid surface with a solution having a hydroxide.

22 Claims, No Drawings

(56) References Cited

FOREIGN PATENT DOCUMENTS

| WO | 06/099308 A2 | 9/2006 |
|---|---|---|
| WO | 2008/025748 A1 | 3/2008 |
| WO | 2008/113011 A2 | 9/2008 |
| WO | 2009/017491 A1 | 2/2009 |
| WO | 2010/034442 A1 | 4/2010 |
| WO | 2010/051360 A1 | 5/2010 |
| WO | 2010/148143 A1 | 12/2010 |

OTHER PUBLICATIONS

Gorbunoff et al.; "The interaction of proteins with hydroxyapatite—I. Role of protein charge and structure"; 1984, *Analytical Biochemistry* vol. 136, No. 2, pp. 425-432.
Larsen et al., "Solubility Study of the Initial Formation of Calcium Orthophosphates from Aqueous Solutions at pH5-10", *Arch Oral Biol.*, vol. 31, No. 9, pp. 565-572 (1986).
Recillas et al., "Studies on the precipitation behavior of calcium phosphate solutions", Journal of Ceramic Processing Research, vol. 13, No. 1, pp. 5-10 (2012).
Schroder et al., "Hydroxyapatite chromatography: altering the phosphate-dependent elution profile of protein as a function of pH", *Analytical Biochemistry*, vol. 313, pp. 176-178 (2003).
The International Search Report from PCT/US2011/021158, dated Mar. 17, 2011.
The International Search Report from PCT/US2011/048082, dated Mar. 20, 2012.
U.S. Appl. No. 13/006,022, filed Jan. 13, 2011 (25 pages).
U.S. Appl. No. 13/205,354, filed Aug. 8, 2011 (26 pages).
U.S. Appl. No. 13/891,502, filed May 10, 2013 (30 pages).
U.S. Appl. No. 14/598,719, filed Jan. 16, 2015 (32 pages).
Extended European Search Report dated Dec. 17, 2014 for EP Application No. 11818724.4, 7 pages.
Extended European Search Report dated Dec. 17, 2015 for EP Application No. 13796784.0.
Extended European Search Report dated Jul. 21, 2014 for EP Application No. 11733384.9, 7 pages.
International Search Report and Written Opinion from PCT/US2013/40591, dated Oct. 8, 2013, 12 pages.
International Search Report and Written Opinion from PCT/US2015/037112, dated Sep. 29, 2015.
International Search Report and Written Opinion from PCT/US2015/037116, dated Sep. 16, 2015, 12 pages.
International Search Report and Written Opinion from PCT/US2015/0371456, dated Oct. 6, 2015.
U.S. Appl. No. 14/932,080, filed Nov. 4, 2015 (xx pages).
U.S. Appl. No. 14/747,162, filed Jun. 23, 2015 (xx pages).
U.S. Appl. No. 14/747,221, filed Jun. 23, 2015 (xx pages).
Sigma-Aldrich, "Sodium phosphate dibasic solution", Sigma-Aldrich Co. LLC, 2016, pp. 1-4.
CTF Ceramic Fluroapatite, Instruction Manual, Bio-Rad Laboratories, Inc. Jan. 9, 2012 (date obtained from WayBackMachine).
Bio-Rad Laboratories, Inc., "CHT Ceramic Hydroxyapatite Instruction Manual," Series E, see Section 5.2.1, Bio-Rad Laboratories, Inc., Hercules, California, downloaded Mar. 30, 2015.
Jeong et al. "Characterization of the cupin-type phosphoglucose isomerase from the hyperthermophilic archaeon Thermococcus litoralis", FEBS LETT, Elsevier, Amsterdam, NL, vol. 535, No. 1-3, Jan. 30, 2003, pp. 200-204.
Janssen et al., "Purification and characterization of a bacterial dehalogenase with activity toward halogenated alkanes, alcohols and ethers", European Journal of Biochemi, Wiley-Blackwell Publishing Ltd, GB, vol. 171, Jan. 1, 1988, pp. 67-72.
Supplementary European Search Report from EP Appl. No. 15790810.4, dated Jan. 16, 2018.

\* cited by examiner

APATITE PRETREATMENT

CROSS-REFERENCES TO RELATED APPLICATIONS

The present application is a continuation application of U.S. patent application Ser. No. 14/747,181, filed Jun. 23, 2015, which claims priority to U.S. Provisional Application No. 62/015,894, filed Jun. 23, 2014; U.S. Provisional Application No. 62/082,017, filed on Nov. 19, 2014; and U.S. Provisional Application No. 62/151,882, filed Apr. 23, 2015, each of which is incorporated in its entirety herein for all purposes.

BACKGROUND

Apatite solid support surfaces, including hydroxyapatite, ceramic apatite, fluorapatite, and fluoride enhanced apatite, among other apatite solid surfaces, are used for purification of a wide variety of target analytes. Apatite is most commonly utilized for purification of biological analytes, including proteins, carbohydrates, polynucleotides, and viral particles. Apatite possesses unique properties as a purification support because it provides affinity, ion exchange and/or hydrophobic interaction modalities in a single support.

Apatite restoration methods restore loss of mass after an apatite purification procedure. Loss of mass can, however, occur prior to an apatite purification procedure, i.e., during hydration of the dry apatite resin, column packing and prior to loading of the sample.

SUMMARY

Disclosed herein are apatite pretreatment methods. Also disclosed herein are apatite regeneration methods.

In an embodiment, a method of treating an apatite solid surface prior to use comprises (a) contacting the apatite solid surface with a phosphate buffered solution at a pH of at least about 6.5; and (b) contacting the apatite solid surface with a solution having a hydroxide. In some embodiments, step (a) is performed before step (b). In some embodiments, the phosphate buffered solution is a solution having from about 0.1 M to about 1.0 M phosphate at a pH of from about 6.5 to about 10.0. In some embodiments, the phosphate buffered solution is 400 mM phosphate at a pH of 8.0. In certain embodiments, the hydroxide is an alkaline hydroxide. In some embodiments, the alkaline hydroxide is sodium or potassium hydroxide.

In some embodiments, the method further includes purifying a target analyte with an apatite solid surface, the purifying comprising: (a) contacting the apatite solid surface with the target analyte, thereby separating the target analyte from one or more contaminants; (b) collecting the target analyte; and (c) regenerating the apatite solid surface the regenerating comprising, (i) contacting the apatite solid surface with a buffered calcium solution comprising a calcium ion at a concentration of at least about 10 mM and a zwitterionic buffer, wherein the ratio of zwitterionic buffer concentration to calcium ion concentration is at least about 2 and the pH of the solution is at least about 6.5; (ii) contacting the apatite solid surface with a phosphate buffered solution at a pH of at least about 6.5; and (iii) contacting the apatite solid surface with a solution comprising an hydroxide.

In one embodiment, the present invention provides a method wherein (a) comprises binding the target analyte to the apatite solid surface, and (b) comprises eluting the target analyte from the apatite solid surface. In another embodiment, (a) comprises contacting the apatite solid surface to the target analyte, thereby flowing the target analyte through the apatite solid surface, and (b) comprises collecting the target analyte in the flow through.

In one embodiment, the zwitterionic buffer is a sulfonic acid containing buffer. In some cases, the sulfonic acid containing buffer is IVIES, PIPES, ACES, MOPSO, MOPS, BES, TES, HEPES, DIPSO, TAPS, TAPSO, POPSO, or HEPPSO, EPPS, CAPS, CAPSO, or CHES. In some cases, the sulfonic acid containing buffer is IVIES.

In one embodiment, the calcium ion is at least 1 mM, 2 mM, 3 mM, 4 mM, 5 mM, 10 mM (e.g., 10.1 mM, 10.2 mM, 10.3 mM, 10.4 mM, or 10.5 mM), 20 mM, 25 mM or at least about 50 mM. In another embodiment, the ratio of zwitterionic buffer concentration to calcium ion concentration is at least about 2.5, 3, or 4. In yet another embodiment, the buffered calcium solution comprises calcium chloride or calcium nitrate. In yet another embodiment, the phosphate buffered solution comprises a solution containing from about 0.1 M or 0.2 M to about 1.0 M phosphate or from about 0.1 M or 0.2 M to about 0.5 M phosphate, at a pH of from about 6.5 to about 8. In some cases, the phosphate buffered solution comprises 400 mM phosphate at a pH of 7.0.

In one embodiment, the hydroxide comprises an alkaline hydroxide. In some cases, the alkaline hydroxide comprises sodium or potassium hydroxide. In one embodiment, the regenerating reverses or eliminates degradation of the column that occurs during protein purification or column cleaning steps. In another embodiment, the regenerating increases the strength of the apatite solid surface by at least about 1%, 5%, 10%, 15%, 20%, or more.

In one embodiment the regenerating is performed before, or replaces, a phosphate cleaning/stripping step that elutes adsorbed biological compounds. In some cases, the regenerating step is performed after elution of target analyte.

In one embodiment, the step (ii) of contacting the apatite solid surface with a solution comprising phosphate at a pH of at least about 6.5 further comprises: contacting the apatite solid surface with a solution comprising phosphate at a concentration of 10 mM, or less than about 10 mM, at a pH of at least about 6.5 or 7; and then contacting the apatite solid surface with a solution comprising phosphate at a concentration of at least about 100 mM, 200 mM, 400 mM, or 500 mM, at a pH of at least about 6.5 or 7.

In one embodiment, the regenerating consists of (i), a wash, (ii), and (iii).

DETAILED DESCRIPTION

Described herein are methods for pretreating apatite solid surfaces. Pretreatment methods have been discovered that prevent or reduce the deterioration (i.e., mass loss) of an apatite solid surface prior to first use in a chromatographic procedure for purifying a target molecule from a sample. A phosphate buffered solution followed by an alkaline hydroxide can be applied prior to a bind and elute or flow through purification procedure.

Also described herein are methods for regenerating apatite solid surfaces. Regeneration methods have been discovered that reduce, eliminate, or reverse the deterioration of an apatite solid surface after use in at least one chromatographic procedure by treating the apatite solid surface with a buffered calcium solution, followed by a phosphate buffered solution, followed by an alkaline hydroxide. The buffered calcium solution, phosphate buffered solution, and alkaline hydroxide can be applied subsequent to a bind and elute or flow through purification procedure.

Definitions

"Apatite" refers to a mineral of phosphate and calcium of the general formula $Ca_5(PO_4)_3(X)$, wherein X is a negatively charged ion. Generally, X is F, Cl, or OH. However, the structure and chemistry of apatite allow for numerous substitutions, including a variety of metal cations (e.g., one or more of K, Na, Mn, Ni, Cu, Co, Zn, Sr, Ba, Pb, Cd, Sb, Y, U, or various rare earth elements) that substitute for Ca in the structure, and anionic complexes (e.g., $AsO_4^{-3}$, $SO_4^{-2}$, $CO_3^{-2}$, $SiO_4^{-4}$, etc.) that substitute for $PO_4^{-3}$.

"Hydroxyapatite" refers to a mixed mode solid support comprising an insoluble hydroxylated mineral of calcium phosphate with the structural formula $Ca_{10}(PO_4)_6(OH)_2$. Its dominant modes of interaction are phosphoryl cation exchange and calcium metal affinity. Hydroxapatite is commercially available in various forms, including but not limited to ceramic, crystalline and composite forms. Composite forms contain hydroxyapatite microcrystals entrapped within the pores of agarose or other beads.

"Fluorapatite" refers to a mixed mode support comprising an insoluble fluoridated mineral of calcium phosphate with the structural formula $Ca_{10}(PO_4)_6F_2$. Its dominant modes of interaction are phosphoryl cation exchange and calcium metal affinity. Fluorapatite is commercially available in various forms, including but not limited to ceramic and crystalline composite forms.

An "apatite solid surface" refers to fused nanocrystals (ceramic apatite), microcrystals, or compounded microcrystals of apatite. Apatite solid surfaces include, but are not limited to, hydroxyapatite, or fluorapatite. Ceramic apatites include, but are not limited to, ceramic hydroxyapatite (e.g., CHT™) or ceramic fluorapatite. Ceramic apatites are a form of apatite minerals in which nanocrystals are agglomerated into particles and fused at high temperature to create stable ceramic microspheres suitable for chromatography applications. Compounded microcrystals include but are not limited to HA Ultragel® (Pall Corp.). Microcrystals include but are not limited to Bio-Gel HTP, Bio-Gel® HT, DNA-Grade HT (Bio-Rad) and Hypatite C (Clarkson Chromatography).

"Sample" refers to any composition having a target molecule or particle of interest. A sample can be unpurified or partially purified. Samples can include samples of biological origin, including but not limited to blood, or blood parts (including but not limited to serum), urine, saliva, feces, as well as tissues. Samples can be derived from unpurified, partially purified, or purified cell lysate or spent cell growth media.

"Target molecule" or "target analyte" refers to a molecule or analyte to be detected in a sample. In some embodiments, the target molecule is a peptide, protein (e.g., an antibody, enzyme, growth regulator, clotting factor, or phosphoprotein), polynucleotide (e.g., DNA, such as dsDNA or ssDNA; RNA, such as mRNA or miRNA; or a DNA-RNA hybrid), aptamer, affimer, peptide nucleic acid, carbohydrate, virus, virus-like particle, drug compound, metabolite, or cell.

Deterioration of a resin that occurs during resin hydration and column packing can cause a loss in calcium, a loss in resin particle strength and an increase in particle breakage. In some embodiments, such effects can be prevented or reduced by the methods described herein.

Deterioration of a resin that occurs upon use in a chromatographic procedure can cause the resin particles to lose their strength and thus to break apart into smaller particles causing blockage in the column. The deterioration can occur as a chemical breakdown of the apatite, causing a loss of mass which can in turn result in a loss of column volume, a loss in particle strength, an increase in particle breakage, or a combination thereof. In some embodiments, such effects can be reversed by the methods described herein. The reversal of deterioration that can be achieved by the practice of the methods described herein can result in a lower rate of resin mass loss, a lower rate of decline in particle strength, or both. In many cases, the reversal of deterioration can be accompanied by increases in resin mass, particle strength, or both.

Mass of the apatite solid surface can be assayed by, e.g., weighing a dried apatite sample, for example after washing away buffer components and adsorbed biological compounds. Apatite media strength can be assayed by, e.g., measuring resistance to agitational force (e.g., stirring), resistance to sonication, or resistance to compression (e.g., application of a uniaxial compressive force). Resistance to sonication or agitational force can be measured by inspection of the apatite solid surface after the treatment to measure the generation of fines. Resistance to compression can be measured by measuring the force required to compress a given mass of apatite to a constant terminal force setting and determining the compressed distance. Apatite deterioration or degradation can be measured relative to a sample that has not been subjected to an apatite purification (i.e., purification of a target molecule using apatite) or an apatite regeneration procedure.

An "alkaline hydroxide" refers to a metal alkali hydroxide comprising any cation elements in Group I of the periodic table, including, e.g., lithium (Li), sodium (Na), potassium (K), rubidium (Rb), cesium (Cs), and francium (Fr). Thus, exemplary alkaline hydroxides include, for example, NaOH, LiOH, and KOH.

A zwitterionic buffer is a buffer that can contain a formal positive and a formal negative electrical charge at the same time. Exemplary zwitterionic buffers can include, but are not limited to, buffers containing a sulfonic acid group. As used herein, a "sulfonic acid" refers to a member of the class of organosulfur compounds with the general formula $RS(=O)_2$—OH, where R is an organic group (e.g., alkyl, or alkene, or aryl) and the $S(=O)_2$—OH group is a sulfonyl hydroxide.

Exemplary zwitterionic buffers containing a sulfonic acid group can include, but are not limited to, aminoalkanesulfonic acids. Exemplary aminoalkanesulfonic acids can include, but are not limited to, aminoalkanesulfonic acids with a minimum of two carbons between amine and sulfonic acid groups. Exemplary zwitterionic buffers containing a sulfonic acid group can include, but are not limited to, N,N-dialkylaminomethanesulfonic acids.

Exemplary zwitterionic buffers containing a sulfonic acid group can include, but are not limited to, IVIES (2-(N-morpholino)ethanesulfonic acid), PIPES (1,4-Piperazinediethanesulfonic acid), ACES (2-(carbamoylmethylamino)ethanesulfonic acid), MOPSO (3-morpholino-2-hydroxypropanesulfonic acid), MOPS (3-morpholinopropane-1-sulfonic acid), BES (N,N-Bis(2-hydroxyethyl)-2-aminoethanesulfonic acid), TES (2-[[1,3-dihydroxy-2-(hydroxymethyl)propan-2-yl]amino]ethanesulfonic acid), HEPES (2-[4-(2-hydroxyethyl)piperazin-1-yl]ethanesulfonic acid), DIPSO (3-(N,N-Bis[2-hydroxyethyl]amino)-2-hydroxypropanesulfonic acid), TAPS (3-[[1,3-dihydroxy-2-(hydroxymethyl)propan-2-yl]amino]propane-1-sulfonic acid), TAPSO (3-[[1,3-dihydroxy-2-(hydroxymethyl)propan-2-yl]amino]-2-hydroxypropane-1-sulfonic acid), POPSO (piperazine-1,4-bis(2- hydroxypropanesulfonic acid)), or HEPPSO (N-(2-Hydroxyethyl)piperazine-N'-(2-hydroxypropanesulfonic acid)), EPPS (N-(2-Hydroxyethyl)piperazine-N'-(3-propanesulfonic acid)), CAPS (3-(Cyclohexylamino)-1-propanesulfonic acid), CAPSO (N-cyclohexyl-2-hydroxyl-3-aminopropanesulfonic acid), CHES (2-(Cyclohexylamino) ethanesulfonic acid), MOBS (4-(N-morpholino) butanesulfonic acid), TABS (N-tris(hydroxymethyl)-4-aminobutanesulfonic acid), or AMPSO (N-(1,1-Dimethyl-2-hydroxyethyl)-3-amino-2-hydroxypropanesulfonic acid).

Calcium ion for use as a restoration material in the procedures described herein can be supplied by calcium hydroxide or by a soluble calcium salt, typically a salt that is soluble in water. Calcium halides and calcium nitrate are examples of calcium salts that can be used. An exemplary calcium halide is calcium chloride. In some cases, calcium chloride is preferred when the chromatography buffer during flow through purification, or the elution buffer during bind and elute purification, contains an alkali metal chloride.

As used herein, the terms "buffer," "buffered," and the like, in the context of a buffered calcium solution refers to a buffer that is compatible with (e.g., does not substantially interact with or precipitate in complex with) calcium and is employed for the purpose of stabilizing the pH of an aqueous solution at or near a specified value, or within a specified range. As such, generally, the "buffer" in a buffered calcium solution cannot be water. In some embodiments, the "buffer" in a buffered calcium solution is not phosphate.

Phosphate can be used in a variety of buffers for apatite equilibration, chromatography, elution, cleaning/stripping, or apatite regeneration. Phosphate can be supplied from any soluble phosphate salt, typically a salt that is soluble in water. Alkali metal or alkaline earth metal phosphates are examples, with sodium or potassium phosphate as particularly convenient examples. Alkali or alkaline earth metal phosphate salts can be utilized in mono- and di-basic forms, or a combination thereof.

As used herein, the term "about" refers to the recited number and any value within 10% of the recited number. Thus, "about 5" refers to any value between 4.5 and 5.5, including 4.5 and 5.5.

I. Introduction

The presence of an ionic species in the buffer that is common to a component of the apatite solid surface (a common ion) can suppress leaching of that component from the apatite solid surface. Thus, calcium and/or phosphate buffers are often preferred during apatite equilibration (e.g., hydration and column packing), loading, flow through, elution, or cleaning/stripping. Accumulation of hydronium ions on the apatite surface can occur due to a variety of mechanisms during equilibration, loading, flow through, and washing steps. In particular, the presence of alkali metal salts can increase, or promote, accumulation of hydronium ions. A high pH phosphate solution (e.g., phosphate at a pH of about 6.5 or higher) of sufficient concentration (e.g., 100, 200, 300, 400 mM, or higher), can provide buffering capacity to mitigate the pH shift that commonly occurs during hydronium ion release, and therefore reduce acid solubilization of the apatite. The use of alkali metal salts concurrently with a phosphate buffer of a suitable pH and concentration generally mitigates mass loss to a significant degree. However, media strength can still be significantly decreased. Neutralization of accumulated hydronium ions can reduce the amount of accumulated hydronium ions, and thus reduce degradation during a subsequent phosphate buffer cleaning step.

Applicants have discovered that an apatite solid surface can be pretreated before use in a chromatographic procedure by treating with a buffered phosphate solution. After contacting the phosphate buffered solution with the apatite solid surface, the apatite solid surface can be further treated with a hydroxide. The methods described herein provide a substantial and surprising degree of pretreatment. This substantial and surprising degree of pretreatment can be indicated as a reduction or elimination of degradation, as measured by loss in calcium.

Applicants have further discovered that the pretreatment method described herein can be combined with a regeneration method. After pretreatment, the apatite solid surface can be significantly regenerated after use in a chromatographic procedure by treating with a buffered calcium solution. In some embodiments, the regeneration method is applied to the apatite solid surface intermittently, i.e., after the first chromatographic procedure and then after two, three or more chromatographic procedures. In some embodiments, the regeneration method is applied to the apatite solid surface after each chromatographic procedure. Generally, the buffered calcium solution is applied after the target molecule has been purified and collected. In some cases, the buffered calcium solution is applied after the apatite solid surface has been cleaned/stripped (e.g., with a high molarity phosphate buffer, such as 400 mM phosphate) and/or sanitized. The buffered calcium solution can be optionally washed away, and then the apatite treated with a phosphate buffered solution. After contacting the phosphate buffered solution with the apatite solid surface, the apatite solid surface can be further treated with a hydroxide. The regeneration procedures described herein provide a substantial and surprising degree of regeneration. This substantial and surprising degree of regeneration can be indicated as a reduction, elimination, or reversal of degradation, as measured by change in apatite mass or loss in apatite strength.

II. Pretreatment Method

Described herein are apatite pretreatment methods for reducing or preventing apatite deterioration by pretreating the apatite solid surface with a phosphate buffered solution, followed by an alkaline hydroxide. The phosphate buffered solution and alkaline hydroxide are applied prior to a protein purification procedure.

A. Phosphate Buffered Solution

The pretreatment method begins by contacting the apatite solid surface with a phosphate containing buffer. The phosphate concentration of the phosphate containing buffer and the amount of the phosphate containing buffer passed through the resin can vary, but will generally be selected as any amount that will prevent or reduce the deterioration of the resin that occurs prior to apatite use (e.g., prior to purification). Without wishing to be bound by theory, it is believed that the phosphate containing buffer interacts with the apatite solid surface to generate a loosely bound (e.g., non-covalent) phosphate layer on the apatite solid surface. Thus, an amount, volume, concentration, etc. of phosphate, or any other component or aspect of the phosphate containing buffer that will prevent or reduce the deterioration of the resin that occurs prior to a purification procedure can be an amount that allows for sufficient formation of a loosely bound phosphate layer.

The phosphate concentration of the phosphate containing buffer is generally selected to be below the solubility limit of the phosphate at the pH and temperature of the buffer. Moreover, the concentration can vary based on presence or absence of other components of the buffer, or the selected composition of any preceding buffer. In certain embodiments of the concepts herein, best results will be achieved with a phosphate concentration of from about 10 mM to about 1, 1.5, or 2 M; from about 20 mM to about 1.5 M; or from about 25 mM to about 1 M; from about 50 mM to about 1 M; including at least about, or about, 10 mM, 15 mM, 20 mM, 25 mM, 30 mM, 40 mM, 50 mM, 60 ppm, 70 mM, 80 mM, 90 mM, 100 mM, 110 mM, 150 mM, 200 mM, 300 mM, 500 mM, 750 mM, 1 M, or higher. In some cases, the phosphate concentration is 10 mM, 15 mM, 20 mM, 25 mM, 30 mM, 40 mM, 50 mM, 60 mM, 70 mM, 80 mM, 90 mM, 100 mM, 110 mM, 150 mM, 200 mM, 300 mM, 500 mM, 750 mM, 1 M, or higher. In some cases, the column is contacted with a low concentration phosphate buffer (e.g., 2, 5, 10, 15, 20, or 25 mM) and then a high concentration phosphate buffer (e.g., 30; 50; 75; 100; 250; 500; 750; 1,000; 1,500; or 2,000 mM).

The pH of the phosphate containing buffer and the amount of the phosphate containing buffer passed through the resin can vary, but will generally be selected as any pH that will prevent or reduce the deterioration of the resin that occurs prior to apatite use (e.g., prior to purification). Exemplary pH values suitable for apatite pretreatment with a phosphate containing buffer include any pH that is at least about 5, at least about 5.5, at least about 6, at least about 6.5, at least about 7, at least about 7.5, at least about 8, or at least about 8.5, or higher. In some cases, the pH of the phosphate containing buffer is 5, 5.5, 6, 6.5, 7, 7.5, 8, 8.5, 9, 9.5, 10, or higher.

The volume of the solution needed to achieve the pretreatment can vary with the phosphate ion concentration, but in most cases best results will be achieved with from about 1.0 to about 10.0 resin volumes of solution, and in many cases with about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or about 3 resin volumes. The volume can be up to about 6 resin volumes, including 2, 3, 4, or 5 resin volumes. In some cases, a high phosphate concentration at a volume that is less than a resin volume (e.g., less than about 0.9, 0.7, 0.5 volumes) can be utilized.

In some embodiments, the apatite solid surface is in a column, e.g., a chromatography column, and the phosphate containing buffer can be applied to the apatite solid surface at a flow rate. The flow rate can vary, but will generally be selected as any rate that will prevent or reduce deterioration of the resin that occurs prior to apatite use (e.g., prior to purification). Suitable flow rates include rates that are typically used during equilibration or loading of apatite. An exemplary flow rate is 400 cm/hr. In some cases, the flow rate is substantially lower than 400 cm/hr (e.g., 300, 200, 100, or 50 cm/hr, or less). The use of a low flow rate can allow a greater contact time between the apatite solid surface and the phosphate containing buffer. A low flow rate can be particularly preferred when the concentration of phosphate, or the volume of the phosphate containing buffer, is low. A low flow rate can also be preferred when the phosphate containing buffer is viscous. Alternatively, the flow rate can be higher than 400 cm/hr. In some cases, the formation of a loosely bound layer of phosphate is rapid and a high flow rate can advantageously reduce the time required for apatite pretreatment. In some cases, the formation of a loosely bound layer of phosphate applies to a column having a diameter of 5 centimeters or less.

In some embodiments, the apatite solid surface is contacted with the phosphate containing buffer in a batch format. In a batch format, the phosphate containing buffer can be applied by pouring the phosphate containing buffer onto the apatite solid surface, or pouring of the apatite solid surface into the phosphate containing buffer. The contact time can vary, but will generally be selected as any time that will prevent or reduce deterioration of the resin that occurs prior to apatite use (e.g., prior to purification).

In some embodiments, the apatite solid surface is then washed or rinsed. In other embodiments, the apatite solid surface is not washed or rinsed after pretreatment with a phosphate containing buffer. One of skill in the art can readily select a suitable wash buffer. In some cases, the resin is treated with a wash solution to remove any excess phosphate ions. Generally, the wash buffer is at a pH, composition, and concentration that does not substantially leach components of the apatite surface, release accumulated hydronium ions, or generate undesirable precipitate. For example, the wash buffer can be compatible, and thus not precipitate when mixed, with the preceding and subsequent buffer. As another example, the wash buffer can be selected that does not leach any loosely bound phosphate layer formed during the contacting of the apatite solid surface with the phosphate buffered solution. Suitable washing buffers can include buffer compositions typically used for equilibration of apatite. In some cases, the apatite solid surface is washed with a low molarity phosphate buffer (e.g., phosphate at a concentration of less than about 100 mM, 50 mM, 25 mM, 20 mM, 15 mM, 10 mM, or 5 mM). The pH of the wash buffer can be at least about 5, at least about 5.5, at least about 6, or at least about 6.5, 7, or 8. In some cases, a water wash is applied, and the amounts can vary widely. A typical water wash will be at least about 0.2 resin volumes, and in most cases from about 0.2 to about 1.5 or from about 0.2 to about 2 resin volumes.

B. Hydroxide

The hydroxide ion treatment is applied as the last step of the apatite solid surface pretreatment (e.g., the hydroxide ion is applied to the apatite solid surface after the phosphate buffered solution). Any soluble form of hydroxide ion can be used, preferably water-soluble. In some cases, alkali metal hydroxides, such as sodium or potassium hydroxide, are particularly convenient. As in the case of the phosphate ion, the concentration and quantity of hydroxide ion solution can vary. Without wishing to be bound by theory, it is believed that the hydroxide interacts with the apatite solid surface, or loosely bound (e.g., non-covalently bound) calcium, phosphate, or calcium and phosphate layer(s), to convert the loosely bound (e.g., non-covalently bound) minerals into apatite, thus providing a pretreated surface. An amount, volume, concentration, etc. of hydroxide that will prevent or reduce the deterioration of the resin that occurs prior to a purification procedure can be an amount that allows for sufficient conversion of loosely bound calcium, phosphate, or calcium phosphate to apatite. Accordingly, in some embodiments, the hydroxide ion solution does not contain calcium or phosphate.

The hydroxide ion concentration can be from about 0.005 or 0.01 M to about 5 M; about 0.1 M to about 4.0 M, and in many cases from about 0.3 M to about 3.0 M, including 0.2 M, 0.5 M, 0.75 M, 1.0 M, 1.25 M, 1.5 M, 2.0 M, or 2.5 M. Suitable volumes of hydroxide ion containing treatment solution range from about 1.0 to about 20.0 resin volumes, and in many cases from about 1.5 to about 10.0 resin volumes, including 2, 3, 4, 4.5, 5, 6, 7, 8, or 9 volumes. In some cases, a high hydroxide concentration at a volume that is less than a resin volume (e.g., less than about 0.9, 0.7, 0.5 volumes) can be utilized.

Following hydroxide treatment, the resin can be washed or equilibrated with a suitable buffer. In some cases, the resin is equilibrated, or washed and then equilibrated, with a loading buffer. For example, the resin can be equilibrated with 10 mM phosphate buffer, pH 6.5 to equilibrate the column for protein purification. In some cases, the resin is equilibrated, or washed and then equilibrated, with a storage buffer. For example, the resin can be equilibrated with 0.1 M NaOH, 10 mM phosphate buffer, pH 6.5 and then stored.

III. Regeneration Methods

In some embodiments, a regeneration method is applied to the pretreated apatite solid surface after each use in a chromatographic procedure. In some embodiments, the regeneration method is applied intermittently to the pretreated apatite solid surface after a chromatographic procedure, i.e., the regeneration method is applied to the pretreated apatite solid surface after two or more purification procedures. In some embodiments, the regeneration method is applied to the pretreated apatite solid surface after the first purification procedure and then after two or more purification procedures.

Protein purification with an apatite resin can generally be performed in two ways: (i) flow through purification; and (ii) bind and elute purification. For flow through purification, traditionally, one (a) equilibrates the column in a suitable buffer; (b) adds a sample to a column under conditions in which impurities bind to the column and the target molecule flows through and is collected, (c) cleans, or strips, the column to remove adsorbed biological compounds with a cleaning/stripping solution (e.g., a high molarity phosphate solution), and (d) regenerates, or sanitizes, the column with a strong alkaline hydroxide solution so that the column can be re-used. In some cases, the strong alkaline hydroxide solution is replaced with a low molarity rinse for long term storage or re-equilibration.

For bind and elute purification, traditionally, one (a) equilibrates the column in a suitable buffer; (b) adds a sample to a column under conditions in which the target molecule binds to the column, (c) elutes the target molecule (e.g., with a high molarity phosphate and/or alkaline halide solution), (d) cleans, or strips, the column to remove adsorbed biological compounds with a cleaning solution (e.g., a high molarity phosphate solution), and (e) regenerates, or sanitizes, the column with a strong alkaline hydroxide solution so that the column can be re-used. In some cases, the strong alkaline hydroxide solution is replaced with a low molarity rinse for long term storage or re-equilibration.

These traditional apatite purification methods can suffer from poor reproducibility and/or premature apatite deterioration. In some cases, this deterioration is due to the accumulation of hydronium ions (H3O+) on the apatite surface during exposure to equilibration, loading, or chromatography buffers. Hydronium ion accumulation can occur during exposure to alkali metal salts at a pH of 8.0 or below. Hydronium ion accumulation can also occur during exposure to phosphate buffers at a pH of less than about 6.5. Other buffer compositions can also cause hydronium ion accumulation. These hydronium ions are then desorbed upon exposure to a subsequent buffer, such as an elution buffer (e.g., during bind and elute purification) or a cleaning/stripping buffer (e.g., after flow through purification). This desorption causes the resin to deteriorate over time, resulting in a loss of resin mass and/or a decline in the particle strength of the resin.

In some embodiments, a sample is contacted with a pretreated apatite solid surface that is equilibrated with a suitable buffer (e.g., an equilibrated apatite solid surface). The target molecule is then collected (e.g., during flow through purification, or after elution), and the apatite is regenerated by contacting the apatite solid surface with a buffered calcium solution, followed by a phosphate buffered solution, followed by an alkaline hydroxide. In some cases, the apatite solid surface is used multiple times (i.e., at least two times) for target analyte purification prior to application of one or more regeneration steps described herein.

In some embodiments, the apatite solid surface is washed or rinsed prior to regenerating. In other embodiments, the apatite solid surface is not washed or rinsed prior to regenerating. In some cases, the resin is treated with a wash solution to remove any excess calcium, phosphate, or hydroxide ions. One of skill in the art can readily select a suitable wash buffer. Generally, the wash buffer can be at a pH, composition, and concentration that does not substantially leach components of the apatite surface, release accumulated hydronium ions, or generate undesirable precipitate. For example, the wash buffer can be compatible, and thus not precipitate when mixed, with the preceding and subsequent buffer. Suitable washing buffers can include buffer compositions typically used for equilibration, loading, or flow through of apatite. In some cases, the apatite solid surface is washed with a low molarity phosphate buffer (e.g., phosphate at a concentration of less than about 100 mM, 50 mM, 25 mM, 20 mM, 15 mM, 10 mM, or 5 mM). The pH of the wash buffer can be at least about 5, at least about 5.5, at least about 6, or at least about 6.5, 7, or 8. An exemplary wash buffer pH is 5.5, 6, or 6.5. In some cases, a water wash is applied, and the amounts can vary widely. A typical water wash will be at least about 0.2 resin volumes, and in most cases from about 0.2 to about 1.5 or from about 0.2 to about 2 resin volumes.

The apatite solid surface can then be regenerated. In some cases, the apatite solid surface can be regenerated, e.g., after elution, after flow through, after neutralization, after cleaning/stripping, after rinsing, or after storage. In some cases, the apatite solid surface can be regenerated after a wash, e.g., after application of a wash buffer to remove a flow through, elution, neutralization, rinsing, storage, or cleaning/stripping buffer.

A. Buffered Calcium Solution

The regeneration begins with contacting the apatite solid surface with a buffered calcium solution. Although, regeneration of the apatite solid surface has been attempted using an unbuffered calcium solution, the present inventors have found that the use of a buffered calcium solution appears to significantly and surprisingly enhance the degree of regeneration obtained. The calcium ion concentration of the buffered calcium solution and the amount of the buffered calcium solution passed through the resin can vary, but will generally be selected as any amount that will reduce, eliminate, or reverse the deterioration of the resin that occurs during apatite use (e.g., during purification, during elution, or during cleaning/stripping).

Without wishing to be bound by theory, it is believed that the buffered calcium solution interacts with the apatite solid surface to generate a loosely bound (e.g., non-covalent) calcium layer on the apatite solid surface. In some cases, this calcium layer replaces some or all (or more than all) of the calcium lost during previous purification steps. Thus, an amount, volume, concentration, etc. of calcium ion, or any other component or aspect of the buffered calcium solution that will reduce, eliminate, or reverse the deterioration of the resin that occurs during apatite use, can be an amount that allows for sufficient formation of a loosely bound calcium layer.

The calcium ion concentration is generally selected to be below the solubility limit of the calcium at the pH and temperature of the buffered calcium solution. Moreover, the concentration can vary based on the presence, absence, or concentration of other components in the buffered calcium solution, such as the selected buffering agent, or based on the selected composition of any preceding buffer. In certain embodiments of the concepts herein, best results will be achieved with a calcium ion concentration of from about 5 mM, 5.1 mM, 5.2 mM, 5.3 mM, 5.4 mM, 5.5 mM, 5.6 mM, 5.7 mM, 5.8 mM, 5.9 mM, 6 mM, 6.5 mM, 7 mM, 8 mM, 9 mM, 10 mM, 10.1 mM, 10.2 mM, 10.3 mM, 10.5 mM or 11 mM to about 15 mM, 20 mM, 25 mM, 30 mM, 40 mM, 50 mM, 75 mM, 100 mM or 250 mM. In certain embodiments, the calcium ion concentration in the buffer calcium solution is from about 5 mM to about 10 mM, from about 5 mM to about 25 mM, from about 20 mM to about 100 mM, or from about 25 mM to about 50-75 mM, including 5 mM, 5.1 mM, 5.2 mM, 5.3 mM, 5.4 mM, 5.5 mM, 5.6 mM, 5.7 mM, 5.8 mM, 5.9 mM, 6 mM, 6.5 mM, 7 mM, 8 mM, 9 mM, 10 mM, 10.1 mM, 10.2 mM, 10.3 mM, 10.5 mM, 11 mM, 12 mM, 13 mM, 14 mM, 15 mM, 20 mM, 25 mM, 30 mM, 40 mM, 60 mM, 70 mM, 80 mM, 90 mM, 110 mM, 150 mM, 200 mM, 300 mM, or higher.

The volume of the solution needed to achieve the restoration can vary with the calcium ion concentration, but in most cases best results will be achieved with from about 1.0 to about 10.0 resin volumes of solution, and in many cases with about 1, 1.1, 1.2, 1.3, 1.4, 1.5, 1.6, 1.7, 1.8, 1.9, or about 2 resin volumes. In some cases, the volume can be up to about 6 resin volumes, including 2, 3, 4, or 5 resin volumes. In some cases, the volume is less than 3 column volumes. In some cases, a high calcium ion concentration at a volume that is less than a resin volume (e.g., less than about 0.9, 0.7, 0.5 volumes) can be utilized.

A wide variety of buffers are suitable for the buffered calcium solution for apatite regeneration. In some embodiments, a buffer for the buffered calcium solution that does not appreciably form metal complexes in solution (e.g., does not form a complex with calcium at the pH of the buffer solution) can comprise the buffer component of the buffered calcium solution. In some embodiments, a buffer that does not contain primary or secondary (i.e., $R_2$—N, wherein R is not H) amine can comprise the buffer component of the buffered calcium solution. In some embodiments, a zwitterionic buffer is preferred. In some embodiments, a buffer (e.g., a zwitterionic buffer) that contains a sulfonic acid moiety is preferred. In some embodiments, a buffer (e.g., a zwitterionic buffer) that contains a sulfonic acid and a tertiary amine (i.e., $R_3$—N, wherein R is not H) is preferred. Exemplary zwitterionic buffers suitable for use as a buffering agent in the buffered calcium solution include, but are not limited to, one or more of the following: MES, PIPES, ACES, MOPSO, MOPS, BES, TES, HEPES, DIPSO, TAPS, TAPSO, POPSO, or HEPPSO, EPPS, CAPS, CAPSO, CHES, MOBS, TABS, or AMPSO. In some embodiments, the buffer of the buffered calcium solution contains a primary, secondary, or a tertiary amine. In some embodiments, the buffer of the buffered calcium solution contains a primary, secondary or a tertiary amine and a one or more carboxylate or hydroxymethyl groups. In some embodiments, the buffer of the buffered calcium solution is tricine, bicine, or Tris. In some embodiments, the buffer of the buffered calcium solution is bis(2-hydroxyethyl)-aminotris(hydroxymethyl)-methane), or 1,3-bis (tris(hydroxymethyl) methylamino) propane.

The buffer concentration in the buffered calcium solution can vary, but will generally be selected as a concentration that is at least as high as the calcium ion concentration of the solution. Moreover, the concentration can vary based on the selected buffering agent, or the selected composition of any preceding buffer. Thus, the ratio of the buffer concentration to the calcium ion concentration is generally at least about 1, e.g., 1, 1.1, 1.2, 1.3, 1.4, 1.5, 1.6, 1.7, 1.8, 1.9, 2, 2.1, 2.2, 2.5, 3, 4, 5, 6, 7, 8, 9, 10, or higher. Generally, the buffer concentration is also selected such that it is below the solubility limit of the buffering agent. In some cases, preferred buffering agents include those that have a high solubility limit.

The pH of the buffered calcium solution can vary, but will generally be selected as any amount that will reduce, eliminate, or reverse deterioration of the resin that occurs during apatite use (e.g., during purification, during elution, or during cleaning/stripping). Moreover, the pH can vary based on the selected apatite solid surface, the selected buffering agent, the selected concentration of one or more components, or the selected composition of any preceding buffer. Typically, the pH is at least about 5, 5.1, 5.2, 5.3, 5.4, 5.5, 5.6, 6, 6.2, 6.5, 7, 7.5, or 8. In some embodiments, the pH is, or is at least about 5.5, 6, 6.5, 7, 7.5, or 8. In some embodiments, the pH is 5.5, 6, 6.5, 7, 7.5, or 8. In some embodiments, the pH is 5.1, 5.2, 5.3, or 5.4. In some cases, the pH is 5.3. In some cases, the pH is 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, or 7.5. In some cases, the pH is 7.0. In some cases, the pH is 5.6. In some cases, the pH is 6.2. In some cases, the pH is 5.4.

In some embodiments, the buffer of the buffered calcium solution is a phosphate buffer. In such cases, the calcium and phosphate concentrations and the pH of the solution can be selected to provide regeneration while avoiding precipitant formation, or avoiding a supersaturated solution. For example, the pH of the phosphate buffered calcium solution can be selected to be sufficiently low (e.g., a pH of about, or less than about, 6.5, 6.4, 6.3, 6.2, 6.1, 6, 5.9, 5.8, 5.7, 5.6, 5.5, 5.4, 5.3, 5.2, 5.1, or 5). In some cases, the pH is 5.1, 5.2, 5.3, 5.4, or 5.5. In some cases, the pH is 5.3. As another example, the calcium concentration of the phosphate buffered calcium solution can be about, or less than about, 50 mM, 40 mM, 35 mM, 30 mM, 25 mM, 20 mM, 15 mM, 10 mM, 7 mM, 6 mM, 5.9 mM, 5.8 mM, 5.7 mM, 5.6 mM, 5.5 mM, 5.4 mM, 5.3 mM, 5.2 mM, 5.1 mM, or 5 mM. In some cases, the calcium concentration of the phosphate buffered solution is, or is about, 15 mM, 14 mM, 13 mM, 12 mM, 11 mM, 10.5 mM, 10.4 mM, 10.3 mM, 10.2 mM, 10.1 mM, 10 mM, or 9.5 mM. In some cases, the calcium concentration is 10 or 10.2 mM. In some cases, the calcium concentration is 10 mM. As another example, the phosphate concentration of the phosphate buffered calcium solution can be about, or less than about, 50 mM, 40 mM, 35 mM, 30 mM, 29 mM, 28 mM, 27 mM, 26 mM, 25 mM, 24 mM, 23 mM, 21 mM, 20 mM, 18 mM, 17 mM, 16 mM, or 15 mM. In some cases, the use of a phosphate buffered calcium solution provides regeneration with or without a preceeding or subsequent high molarity (e.g., 0.1, 0.2, 0.3, 0.4, 0.5, 0.6, 0.7, 0.8, 0.9, or 1 M) phosphate buffer step.

In some embodiments, the apatite solid surface is in a column, e.g., a chromatography column, and the buffered calcium solution can be applied to the apatite solid surface at a flow rate. The flow rate can vary, but will generally be selected as any rate that will reduce, eliminate, or reverse deterioration of the resin that occurs during apatite use (e.g., during purification, during elution, or during cleaning/stripping). Suitable flow rates, include rates that are typically used during equilibration, loading, elution, cleaning/stripping, sanitation, or rinsing of apatite. An exemplary flow rate is 400 cm/hr. In some cases, the flow rate is substantially lower than 400 cm/hr (e.g., 300, 200, 100, or 50 cm/hr, or less). The use of a low flow rate can allow a greater contact time between the apatite solid surface and the buffered calcium solution. A low flow rate can be particularly preferred when the concentration of calcium or buffering agent, or the volume of the buffered calcium solution, is low. A low flow rate can also be preferred when the buffered calcium solution, or the preceding solution, is viscous or the column is fouled with adsorbed biological compounds. Alternatively, the flow rate can be higher than 400 cm/hr. In some cases, the formation of a loosely bound layer of calcium is rapid and a high flow rate can advantageously reduce the time required for apatite regeneration.

In some embodiments, the apatite solid surface is contacted with the buffered calcium solution in a batch format. In a batch format, the buffered calcium solution can be applied by pouring the buffered calcium solution onto the apatite solid surface, or pouring a slurry of the apatite solid surface into the buffered calcium solution. The contact time can vary, but will generally be selected as any time that will reduce, eliminate, or reverse deterioration of the resin that occurs during apatite use (e.g., during purification, during elution, or during cleaning/stripping).

In some embodiments, the apatite solid surface is then washed or rinsed. One of skill in the art can readily select a suitable wash buffer. In some cases, the resin is treated with a wash solution between the individual regeneration treatments to remove any excess calcium, phosphate, or hydroxide ions. Generally, the wash buffer can be at a pH, composition, and concentration that does not substantially leach components of the apatite surface, release accumulated hydronium ions, or generate undesirable precipitate. For example, the wash buffer can be compatible, and thus not precipitate when mixed, with the preceding and subsequent buffer. As another example, the wash buffer can be selected that does not leach any loosely bound calcium layer formed during the contacting of the apatite solid surface with the buffered calcium solution. Suitable washing buffers can include buffer compositions typically used for equilibration, loading, or flow through of apatite. In some cases, the apatite solid surface is washed with a low molarity phosphate buffer (e.g., phosphate at a concentration of less than about 100 mM, 50 mM, 25 mM, 20 mM, 15 mM, 10 mM, or 5 mM). The pH of the wash buffer can be at least about 5, at least about 5.5, at least about 6, or at least about 6.5, 7, or 8. In some cases, a water wash is applied, and the amounts can vary widely. A typical water wash will be at least about 0.2 resin volumes, and in most cases from about 0.2 to about 1.5 or from about 0.2 to about 2 resin volumes.

B. Phosphate Buffered Solution

The apatite solid surface can then be contacted with a phosphate containing buffer after the apatite has been contacted with a buffered calcium solution. Alternatively, the phosphate containing buffer can be contacted with apatite before the apatite has been contacted with a buffered calcium solution. In some cases, an intervening wash step is applied between the buffered calcium solution and the phosphate containing buffer. The phosphate concentration of the phosphate containing buffer and the amount of the phosphate containing buffer passed through the resin can vary, but will generally be selected as any amount that will reduce, eliminate, or reverse the deterioration of the resin that occurs during apatite use (e.g., during purification, during elution, or during cleaning/stripping) and can be an amount that allows for sufficient formation of a loosely bound phosphate layer.

The phosphate concentration of the phosphate containing buffer is generally selected to be below the solubility limit of the phosphate at the pH and temperature of the buffer. Moreover, the concentration can vary based on presence or absence of other components of the buffer, or the selected composition of any preceding buffer. In certain embodiments of the concepts herein, best results will be achieved with a phosphate concentration of from about 10 mM to about 1, 1.5, or 2 M; from about 20 mM to about 1.5 M; or from about 25 mM to about 1 M; from about 50 mM to about 1 M; including at least about, or about, 10 mM, 15 mM, 20 mM, 25 mM, 30 mM, 40 mM, 50 mM, 60 ppm, 70 mM, 80 mM, 90 mM, 100 mM, 110 mM, 150 mM, 200 mM, 300 mM, 500 mM, 750 mM, 1 M, or higher. In some cases, the phosphate concentration is 10 mM, 15 mM, 20 mM, 25 mM, 30 mM, 40 mM, 50 mM, 60 mM, 70 mM, 80 mM, 90 mM, 100 mM, 110 mM, 150 mM, 200 mM, 300 mM, 500 mM, 750 mM, 1 M, or higher. In some cases, the phosphate concentration is from, or from about, 0.1 or 2 M to, or to about, 0.4 M, 0.5 M, or 1 M. In some cases, the column is contacted with a low concentration phosphate buffer (e.g., 2, 5, 10, 15, 20, or 25 mM) and then a high concentration phosphate buffer (e.g., 30; 50; 75; 100; 250; 500; 750; 1,000; 1,500; or 2,000 mM). In some cases, the use of a low concentration phosphate buffer followed by a high concentration phosphate buffer can avoid potential incompatibility (e.g., precipitation) between the buffered calcium solution and the high concentration phosphate buffer.

The pH of the phosphate containing buffer and the amount of the phosphate containing buffer passed through the resin can vary, but will generally be selected as any pH that will reduce, eliminate, or reverse the deterioration of the resin that occurs during apatite use (e.g., during purification, during elution, or during cleaning/stripping). Exemplary pH values suitable for apatite regeneration with a phosphate containing buffer include any pH that is at least about 5, at least about 5.5, at least about 6, at least about 6.5, at least about 7, at least about 7.5, at least about 8, or at least about 8.5, or higher. In some cases, the pH of the phosphate containing buffer is 5, 5.5, 6, 6.5, 7, 7.5, 8, 8.5, 9, 9.5, 10, or higher.

The volume of the solution needed to achieve the restoration can vary with the phosphate ion concentration, but in most cases best results will be achieved with from about 1.0 to about 10.0 resin volumes of solution, and in many cases with about 1, 1.1, 1.2, 1.3, 1.4, 1.5, 1.6, 1.7, 1.8, 1.9, or about 2 resin volumes. The volume can be up to about 6 resin volumes, including 2, 3, 4, or 5 resin volumes. In some cases, a high phosphate concentration at a volume that is less than a resin volume (e.g., less than about 0.9, 0.7, 0.5 volumes) can be utilized.

In some embodiments, the apatite solid surface is in a column, e.g., a chromatography column, and the phosphate containing buffer can be applied to the apatite solid surface at a flow rate. The flow rate can vary, but will generally be selected as any rate that will reduce, eliminate, or reverse deterioration of the resin that occurs during apatite use (e.g., during purification, during elution, or during cleaning/stripping). Suitable flow rates, include rates that are typically used during equilibration, loading, elution, cleaning/stripping, sanitation, or rinsing of apatite. An exemplary flow rate is 400 cm/hr. In some cases, the flow rate is substantially lower than 400 cm/hr (e.g., 300, 200, 100, or 50 cm/hr, or less). The use of a low flow rate can allow a greater contact time between the apatite solid surface and the phosphate containing buffer. A low flow rate can be particularly preferred when the concentration of phosphate, or the volume of the phosphate containing buffer, is low. A low flow rate can also be preferred when the phosphate containing buffer, or the preceding solution, is viscous or the column is fouled with adsorbed biological compounds. Alternatively, the flow rate can be higher than 400 cm/hr. In some cases, the formation of a loosely bound layer of phosphate is rapid and a high flow rate can advantageously reduce the time required for apatite regeneration.

In some embodiments, the apatite solid surface is contacted with the phosphate containing buffer in a batch format. In a batch format, the phosphate containing buffer can be applied by pouring the phosphate containing buffer onto the apatite solid surface, or pouring a slurry of the apatite solid surface into the phosphate containing buffer. The contact time can vary, but will generally be selected as any time that will reduce, eliminate, or reverse deterioration of the resin that occurs during apatite use (e.g., during purification, during elution, or during cleaning/stripping).

In some embodiments, the apatite solid surface is then washed or rinsed. In other embodiments, the apatite solid surface is not washed or rinsed after regeneration treatment with a phosphate containing buffer. One of skill in the art can readily select a suitable wash buffer. In some cases, the resin is treated with a wash solution to remove any excess calcium, phosphate, or hydroxide ions. Generally, the wash buffer is at a pH, composition, and concentration that does not substantially leach components of the apatite surface, release accumulated hydronium ions, or generate undesirable precipitate. For example, the wash buffer can be compatible, and thus not precipitate when mixed, with the preceding and subsequent buffer. As another example, the wash buffer can be selected that does not leach any loosely bound calcium layer formed during the contacting of the apatite solid surface with the buffered calcium solution. Suitable washing buffers can include buffer compositions typically used for equilibration, loading, or flow through of apatite. In some cases, the apatite solid surface is washed with a low molarity phosphate buffer (e.g., phosphate at a concentration of less than about 100 mM, 50 mM, 25 mM, 20 mM, 15 mM, 10 mM, or 5 mM). The pH of the wash buffer can be at least about 5, at least about 5.5, at least about 6, or at least about 6.5, 7, or 8. In some cases, a water wash is applied, and the amounts can vary widely. A typical water wash will be at least about 0.2 resin volumes, and in most cases from about 0.2 to about 1.5 or from about 0.2 to about 2 resin volumes.

A degree of resin regeneration can be achieved with either the buffered calcium solution treatment preceding the phosphate containing buffer treatment, or with the phosphate containing buffer treatment preceding the buffered calcium solution treatment. In some embodiments, a greater degree of regeneration can be achieved by applying the buffered calcium solution treatment first, followed by the phosphate containing buffer treatment. In some embodiments, a preferred degree of regeneration can be achieved by performing one or more steps of buffered calcium solution treatment subsequent to, or followed by, one or more steps of phosphate containing buffer treatment. In some cases, one or more of multiple steps of buffered calcium solution treatment or phosphate containing buffer treatment are preceded by or followed by a wash.

In some embodiments, the buffered calcium solution treatment and/or the phosphate containing buffer treatment is applied after elution or flow through of a target analyte. For example, an apatite surface can be equilibrated, contacted with a target analyte, the target analyte can be eluted or collected in the flow through, and then the regeneration protocol can be applied. As described herein, exemplary regeneration protocols can include, but are not limited to, those in which a buffered calcium solution is contacted with the apatite solid surface and then a phosphate buffer is contacted with the apatite solid surface. Exemplary regeneration protocols can further include, but are not limited to, those in which a phosphate regeneration buffer is contacted with the apatite solid surface and then a buffered calcium regeneration solution is contacted with the apatite solid surface. An alkaline hydroxide treatment can be applied after the apatite is contacted with the buffered calcium and phosphate regeneration solutions.

C. Hydroxide

The hydroxide ion treatment is applied as the last treatment step of the apatite solid surface regeneration. Any soluble form of hydroxide ion can be used, preferably water-soluble. In some cases, alkali metal hydroxides, such as sodium or potassium hydroxide, are particularly convenient. As in the cases of the calcium ion and the phosphate ion, the concentration and quantity of hydroxide ion solution can vary. An amount, volume, concentration, etc. of hydroxide that will reduce, eliminate, or reverse the deterioration of the resin that occurs during apatite use can be an amount that allows for sufficient conversion of loosely bound calcium, phosphate, or calcium phosphate to apatite. The hydroxide ion can also clean the resin of residual proteins and contaminants and can also serve as a sanitation or storage solution.

The hydroxide ion concentration can be from about 0.005 or 0.01 M to about 5 M; about 0.1 M to about 4.0 M, and in many cases from about 0.3 M to about 3.0 M, including 0.2 M, 0.5 M, 0.75 M, 1.0 M, 1.25 M, 1.5 M, 2.0 M, or 2.5 M. Suitable volumes of hydroxide ion containing treatment solution range from about 1.0 to about 20.0 resin volumes, and in many cases from about 1.5 to about 10.0 resin volumes, including 2, 3, 4, 4.5, 5, 6, 7, 8, or 9 volumes. In some cases, a high hydroxide concentration at a volume that is less than a resin volume (e.g., less than about 0.9, 0.7, 0.5 volumes) can be utilized.

Following hydroxide treatment, the resin can be washed or equilibrated with a suitable buffer. In some cases, the resin is equilibrated, or washed and then equilibrated, with a loading buffer. For example, the resin can be equilibrated with 10 mM phosphate buffer, pH 6.5 to equilibrate the column for protein purification. In some cases, the resin is equilibrated, or washed and then equilibrated, with a storage buffer. For example, the resin can be equilibrated with 0.1 M NaOH, 10 mM phosphate buffer and then stored.

EXAMPLES

The following examples are provided by way of illustration only and not by way of limitation. Those of skill in the art will readily recognize a variety of non-critical parameters that could be changed or modified to yield essentially the same or similar results.

Example 1

This example illustrates the deterioration (i.e., leaching of calcium) of a hydroxyapatite resin prior to first use in a purification procedure.

Four experiments were conducted to determine the extent of calcium leaching of four contact solutions: (1) 0.4 M NaPO4 at pH 8.8, (2) 1 M NaCl, (3) PBS at pH 7.4 (12 mM phosphate, 0.15 M NaCl, pH 7.4), and (4) 0.4 M NaPO4 at pH 6.6. The experiment was performed with columns measuring 20 cm in length and 3.2 cm in internal diameter, with an internal volume of 159 mL. Each column was dry packed with 100 g of ceramic hydroxyapatite Type I powder, then hydrated by pumping 240 mL of the contact solution into the column inlet and stopping just prior to the effluent exiting the column. The column exit was connected to conductivity and pH flow monitors, then to a fraction collector. The column was eluted at 140 cm/hour while collecting 6×0.25 column volume fractions of effluent (240 mL). The amount of hydrate (160 mL) and collected contact solution (i.e., total solution volume of 400 mL or 2.5 column volumes) is equivalent to the amount of solution recommended for a mixture of ceramic hydroxyapatite/contact solution in preparation for hydrated packing of process columns. Table I below lists the pH of effluent fractions, the calcium concentration for each fraction, and the estimated calcium leaching in a typical slurry mixture used for process chromatography column packing. The calcium concentration was determined with a colorimetric assay (BioAssay Systems kit DICA-500 or the Biovision kit K380-250).

TABLE I

Calcium Effluent Analysis and Estimated Calcium Level in Slurry Mixtures

| Contact Solution | ID | pH | Calcium concentration ppm | Solution Volume (400 mL) ppm |
|---|---|---|---|---|
| 0.4M NaPO4, pH 8.8 | 6141-083 A1 | 5.95 | 56 | 6 |
| | A2 | 7.41 | 0 | |
| | A3 | 7.93 | 0 | |
| | A4 | 8.13 | 0 | |
| | A5 | 8.31 | 0 | |
| | A6 | 8.43 | 0 | |
| 1M NaCl | 6141-083 B1 | 5.13 | 1576 | 339 |
| | B2 | 5.29 | 739 | |
| | B3 | 5.45 | 402 | |
| | B4 | 5.54 | 263 | |
| | B5 | 5.60 | 228 | |
| | B6 | 5.65 | 180 | |
| PBS, pH 7.4 | 6141-083 C1 | 5.90 | 425 | 131 |
| | C2 | 5.76 | 356 | |
| | C3 | 5.76 | 208 | |
| | C4 | 5.76 | 158 | |
| | C5 | 5.76 | 114 | |
| | C6 | 5.76 | 43 | |
| 0.4M NaPO4, pH 6.6 | 6141-083 D1 | 5.55 | 105 | 14 |
| | D2 | 6.53 | 8 | |
| | D3 | 6.59 | 5 | |
| | D4 | 6.62 | 5 | |
| | D5 | 6.57 | 5 | |
| | D6 | 6.58 | 5 | |

The data in Table I show that PBS, pH 7.4 and 1 M NaCl contact solutions leach large amounts of calcium, whereas contact solutions having 0.4 M phosphate at either pH 6.6 or 8.8 do not leach large amounts of calcium. The results confirm that phosphate contact solution minimizes calcium leaching while hydrating the hydroxyapatite powder.

Example 2

This example illustrates the result of incorporating an intermittent or continuous in situ regeneration (ISR) protocol after a pretreatment protocol. The apatite resin is exposed to a series of cycles that simulate conditions encountered in protein separation, but without loading and eluting protein.

All columns used in the following eight experiments underwent a pretreatment protocol (i.e., all columns were dry packed and then equilibrated with 0.4 M sodium phosphate buffer, pH 8.8 followed by either 0.5 M or 1 M sodium hydroxide) prior to the experiments described below. The description and conditions for the eight experiments are listed in Tables II through IX below. A series of consecutive cycles were performed for each experiment, each cycle consisting of the steps indicated in each table. Experiments outlined in Tables II-VI used 30 cycles each. The experiment outlined in Table VII used 10 cycles. The experiments outlined in Tables VIII and IX used 24 cycles and 5 cycles, respectively.

The experiments outlined in Tables II-III and V-VII were each performed on a column measuring 30 cm in length and 1.6 cm internal diameter with an internal volume of 60.32 mL. The packing was ceramic hydroxyapatite Type I in 40-micron particles weighing 38 grams and the resulting mobile phase flow rate through the column being 180 cm/hour. The experiment outlined in Tables IV, VIII and IX were performed on a column having a length of 20 cm, a 1.6 cm internal diameter, an internal volume of 40.21 mL and with a mobile phase flow rate of 350 cm/hour. The packing was ceramic hydroxyapatite Type I in 40-micron particles weighing 25.33 grams. Mobile phase entry was at the top of each of the columns.

Tables II-IV simulate control purification protocols without column restoration. In step 3 of the Table III control protocol, polysaccharide is loaded onto the column. The control protocol in Table IV simulates an acidic protein elution with a shallow phosphate gradient (see step 6).

In Tables IV, VIII and IX, dilute WS refers to an WS concentration of at least about 10 mM, 15 mM, or 20 mM IVIES and less than about 25 mM or 30 mM WS. Dilute Tris refers to a Tris concentration of at least about 2 mM, 3 mM, 4 mM, 5 mM, 10 mM, or 15 mM Tris and less than about 20 mM, or 25 mM Tris.

TABLE II

Control Treatment Protocol Using 30 Cycles

| | | | Amount | |
|---|---|---|---|---|
| Step | Description | Mobile Phase | Column Volumes | Volume in mL |
| 1 | Pre-Equilibration/Regeneration | 0.5M NaPO4, pH 7.0 | 2.5 | 150.8 |
| 2 | Equilibration | 25 mM NaPO4, 250 mM NaCl, pH 7.0 | 2.5 | 150.8 |
| 3 | Product load | 25 mM NaPO4, 250 mM NaCl, pH 7.0 | 3.0 | 181.0 |
| 4 | Product recovery flush | 25 mM NaPO4, 250 mM NaCl, pH 7.0 | 2.5 | 150.8 |
| 5 | Pre-Equilibration/Regeneration | 0.5M NaPO4, pH 7.0 | 5.0 | 301.6 |
| 6 | Sanitization | 0.5M NaOH | 4.5 | 271.4 |

TABLE III

Control Treatment Protocol Using 30 Cycles and Simulating a Saccharide Load

| Step | Description | Mobile Phase | Column Volumes | Volume in mL |
|---|---|---|---|---|
| 1 | Pre-Equilibration/Regeneration | 0.5M NaPO4, pH 7.0 | 2.5 | 150.8 |
| 2 | Equilibration | 25 mM NaPO4, 250 mM NaCl, pH 7.0 | 2.5 | 150.8 |
| 3 | Product load | 25 mM NaPO4, 250 mM NaCl, pH 7.0, 2% DEX T500 | 3.0 | 181.0 |
| 4 | Product recovery flush | 25 mM NaPO4, 250 mM NaCl, pH 7.0 | 0.5 | 30.2 |
| 5 | Product recovery flush | 25 mM NaPO4, 250 mM NaCl, pH 7.0 | 2.5 | 150.8 |
| 6 | Pre-Equilibration/Regeneration | 0.5M NaPO4, pH 7.0 | 5.0 | 301.6 |
| 7 | Sanitization | 0.5M NaOH | 4.5 | 271.4 |

TABLE IV

Control Treatment Protocol Using 30 Cycles and Simulating an Acidic Protein Elution

| Step | Description | Mobile Phase | Column Volumes | Volume in mL |
|---|---|---|---|---|
| 1 | Equilibration 1 | 50 mM NaPO4, 0.1M NaCl, pH 6.7 | 1.0 | 40.2 |
| 2 | Equilibration 1 | 50 mM NaPO4, 0.1M NaCl, pH 6.7 | 4.0 | 160.8 |
| 3 | Equilibration 2 | 2 mM NaPO4, dilute MES, 0.1M NaCl, pH 6.7 | 3.0 | 120.6 |
| 4 | Load | 2 mM NaPO4, dilute MES, dilute Tris, 0.1M NaCl, pH 6.7 | 7.0 | 281.5 |
| 5 | Post-load wash | 2 mM NaPO4, 0.1M NaCl, pH 6.5 | 3.0 | 120.6 |
| 6 | Gradient | 10% Equilibration 1, 90% 0.1M NaCl --> 90% Equilibration 1, 10% 0.1M NaCl | 10.0 | 402.1 |
| 7 | Strip with Equilibration 1 | 50 mM NaPO4, 0.1M NaCl, pH 6.7 | 2.0 | 80.4 |
| 8 | Sanitization | 1M NaOH | 2.0 | 80.4 |

Tables V and VI are restoration protocols that use a low concentration of buffer and calcium chloride in the buffered calcium step (i.e., step 6 in each protocol).

TABLE V

Column Restoration Protocol

| Step | Description | Mobile Phase | Column Volumes | Volume in mL |
|---|---|---|---|---|
| 1 | Pre-Equilibration/Regeneration | 0.5M NaPO4, pH 7.0 | 2.5 | 150.8 |
| 2 | Equilibration | 25 mM NaPO4, 250 mM NaCl, pH 7.0 | 2.5 | 150.8 |
| 3 | Product load | 25 mM NaPO4, 250 mM NaCl, pH 7.0 | 3.0 | 181.0 |
| 4 | Product recovery flush | 25 mM NaPO4, 250 mM NaCl, pH 7.0 | 2.5 | 150.8 |
| 5 | Rinse | Water | 1.0 | 60.3 |
| 6 | In-Situ Restoration | 20 mM ACES, 5 mM CaCl2, pH 7.75 | 8.0 | 482.5 |
| 7 | Rinse | Water | 1.0 | 60.3 |
| 8 | Pre-Equilibration/Regeneration | 0.5M NaPO4, pH 7.0 | 5.0 | 301.6 |
| 9 | Sanitization | 0.5M NaOH | 4.5 | 271.4 |

TABLE VI

Column Restoration Protocol

| Step | Description | Mobile Phase | Column Volumes | Volume in mL |
|---|---|---|---|---|
| 1 | Pre-Equilibration/Regeneration | 0.5M NaPO4, pH 7.0 | 2.5 | 150.8 |
| 2 | Equilibration | 25 mM NaPO4, 250 mM NaCl, pH 7.0 | 2.5 | 150.8 |
| 3 | Product load | 25 mM NaPO4, 250 mM NaCl, pH 7.0 | 3.0 | 181.0 |

TABLE VI-continued

Column Restoration Protocol

| | | | Amount | |
|---|---|---|---|---|
| Step | Description | Mobile Phase | Column Volumes | Volume in mL |
| 4 | Product recovery flush | 25 mM NaPO4, 250 mM NaCl, pH 7.0 | 2.5 | 150.8 |
| 5 | Rinse | Water | 1.0 | 60.3 |
| 6 | In-Situ Restoration | 20 mM MES, 5 mM CaCl2, pH 7.80 | 8.0 | 482.5 |
| 7 | Rinse | Water | 1.0 | 60.3 |
| 8 | Pre-Equilibration/Regeneration | 0.5M NaPO4, pH 7.0 | 5.0 | 301.6 |
| 9 | Sanitization | 0.5M NaOH | 4.5 | 271.4 |

Table VII is an intermittent restoration protocol that was applied after pretreatment of the resin and after applying a control treatment protocol as outlined in Table II. The intermittent restoration protocol includes a restoration protocol (i.e., steps R1-R7 in Table VII) followed by two control protocols (i.e., steps C1-C4 in Table VII). The steps listed in Table VII were repeated 10 times resulting in a total of 10 restoration protocols and 20 control protocols.

TABLE VII

Intermittent Column Restoration Protocol

| | | | Amount | |
|---|---|---|---|---|
| Step | Description | Mobile Phase | Column Volumes | Volume in mL |
| R1 | Pre-Equilibration/Regeneration | 0.5M NaPO4, pH 7.0 | 2.5 | 150.8 |
| R2 | Equilibration-Load-Flush | 25 mM NaPO4, 250 mM NaCl, pH 7.0 | 8.0 | 482.5 |
| R3 | Rinse | Water | 1.0 | 60.3 |
| R4 | In-Situ Restoration | 20 mM ACES, 5 mM CaCl2, pH 7.75 | 8.0 | 482.5 |
| R5 | Rinse | Water | 1.0 | 60.3 |
| R6 | Pre-Equilibration/Regeneration | 0.5M NaPO4, pH 7.0 | 5.0 | 301.6 |
| R7 | Sanitization | 0.5M NaOH | 4.5 | 271.4 |
| C1 | Pre-Equilibration/Regeneration | 0.5 NaPO4, pH 7.0 | 2.5 | 150.8 |
| C2 | Eq-Load-Flush | 25 mM NaPO4, 250 mM NaCl, pH 7.0 | 8.0 | 482.5 |
| C3 | Pre-Equilibration/Regeneration | 0.5M NaPO4, pH 7.0 | 5.0 | 301.6 |
| C4 | Sanitization | 0.5M NaOH | 4.5 | 271.4 |
| C1 | Pre-Equilibration/Regeneration | 0.5M NaPO4, pH 7.0 | 2.5 | 150.8 |
| C2 | Equilibration/Load/Flush | 25 mM NaPO4, 250 mM NaCl, pH 7.0 | 8.0 | 482.5 |
| C3 | Pre-Equilibration/Regeneration | 0.5M NaPO4, pH 7.0 | 5.0 | 301.6 |
| C4 | Sanitization | 0.5M NaOH | 4.5 | 271.4 |

Tables VIII and IX are column restoration protocols that include a high concentration of buffer and calcium chloride in the buffered calcium solution (see Step 9) than the restoration protocols in Tables V-VII (i.e., 50 mM CaCl2/100 mM MES/pH 7.0 versus 5 mM CaCl2/20 mM ACES or MES/pH 7.8). The protocol in Table VIII uses less column volumes and more cycles of the stronger buffered calcium solution than the protocol in Table IX (i.e., 1.1 column volumes/24 cycles for the protocol in Table VIII versus 3.0 column volumes/5 cycles for the protocol in Table IX).

TABLE VIII

Column Restoration Protocol

| | | | Amount | |
|---|---|---|---|---|
| Step | Description | Mobile Phase | Column Volumes | Volume in mL |
| 1 | Equilibration 1 | 50 mM NaPO4, 0.1M NaCl, pH 6.7 | 1.0 | 40.2 |
| 2 | Equilibration 1 | 50 mM NaPO4, 0.1M NaCl, pH 6.7 | 4.0 | 160.8 |

TABLE VIII-continued

Column Restoration Protocol

| | | | Amount | |
|---|---|---|---|---|
| Step | Description | Mobile Phase | Column Volumes | Volume in mL |
| 3 | Equilibration 2 | 2 mM NaPO4, dilute MES, 0.1M NaCl, pH 6.7 | 3.0 | 120.6 |
| 4 | Load | 2 mM NaPO4, dilute MES, dilute Tris, 0.1M NaCl, pH 6.7 | 7.0 | 281.5 |
| 5 | Post-load wash | 2 mM NaPO4, 0.1M NaCl, pH 6.5 | 3.0 | 120.6 |
| 6 | Gradient | 10% Equilibration 1, 90% 0.1M NaCl --> 90% Equilibration 1, 10% 0.1M NaCl | 10.0 | 402.1 |
| 7 | Strip with Equilibration 1 | 50 mM NaPO4, 0.1M NaCl, pH 6.7 | 2.0 | 80.4 |
| 8 | Equilibration 2 | 2 mM NaPO4, dilute MES, 0.1M NaCl, pH 6.7 | 0.20 | 8.04 |
| 9 | In-Situ Restoration | 100 mM MES, 50 mM CaCl2, pH 7.0 | 1.1 | 44.2 |
| 10 | Equilibration 2 | 2 mM NaPO4, dilute MES, 0.1M NaCl, pH 6.7 | 0.20 | 8.04 |
| 11 | Pre-Equilibration/Regeneration | 400 mM NaPO4, pH 7.0 | 2.0 | 80.4 |

TABLE IX

Column Restoration Protocol

| | | | Amount | |
|---|---|---|---|---|
| Step | Description | Mobile Phase | Column Volumes | Volume in mL |
| 1 | Equilibration 1 | 50 mM NaPO4, 0.1M NaCl, pH 6.7 | 1.0 | 40.2 |
| 2 | Equilibration 1 | 50 mM NaPO4, 0.1M NaCl, pH 6.7 | 4.0 | 160.8 |
| 3 | Equilibration 2 | 2 mM NaPO4, dilute MES, 0.1M NaCl, pH 6.7 | 3.0 | 120.6 |
| 4 | Load | 2 mM NaPO4, dilute MES, dilute Tris, 0.1M NaCl, pH 6.7 | 7.0 | 281.5 |
| 5 | Post-load wash | 2 mM NaPO4, 0.1M NaCl, pH 6.5 | 3.0 | 120.6 |
| 6 | Gradient | Gradient 10-90% Equil-1 against 0.1M NaCl | 10.0 | 402.1 |
| 7 | Strip with Equilibration 1 | 50 mM NaPO4, 0.1M NaCl, pH 6.7 | 2.0 | 80.4 |
| 8 | Equilibration 2 | 2 mM NaPO4, dilute MES, 0.1M NaCl, pH 6.7 | 0.20 | 8.04 |
| 9 | In-Situ Restoration | 100 mM MES 50 mM CaCl2, pH 7.0 | 3.0 | 120.6 |
| 10 | Equilibration 2 | 2 mM NaPO4, dilute MES, 0.1M NaCl, pH 6.7 | 0.20 | 8.04 |
| 11 | Pre-Equilibration/Regeneration | 400 mM NaPO4, pH 7.0 | 2.0 | 80.4 |
| 12 | Sanitization | 1M NaOH | 2.0 | 80.4 |

The particle mass and particle strength was measured before the first cycle and after the last cycle for each protocol described in Tables II-IX. Uniaxial confined bulk compression was used to determine the particle strength. Table X lists the results for the protocols described in Tables II-IX.

TABLE X

Results

| Experiment Number | Table reference | Description | Mass change, % | Strength change, % |
|---|---|---|---|---|
| 1 | II | Control | −1.3 | −22.8 |
| 2 | III | Control; Simulated Saccharide Product Load | −0.7 | −26.4 |
| 3 | IV | Control; Simulated Acidic Protein Elution | −3.7 | −32.9 |
| 4 | V | ISR; low concentration of calcium chloride and buffer | 15.7 | 48.1 |
| 5 | VI | ISR; low concentration of calcium chloride and buffer | 13.4 | 26.5 |
| 6 | VII | Intermittant ISR | 3.3 | 3.9 |
| 7 | VIII | ISR; high concentration of calcium chloride and buffer | 16.5 | 29.3 |
| 8 | IX | ISR; high concentration of calcium chloride and buffer | 3.3 | 5.2 |

The data for each of the control protocols in experiments 1-3 (i.e., Tables II-IV) in Table X show little loss in mass and a significant decrease in particle strength, indicating degradation of the resin. Hydroxyapatite obtained from columns operated using continuous restoration protocols having low concentrations of calcium chloride and buffer (i.e., experiments 4 and 5; Tables V and VI) exhibited surprisingly significant gains in mass and strength relative to the control protocols, indicating regeneration of the resin. These results demonstrate that the buffered calcium solution provides a significant and surprising degree of regeneration even when a low concentration of calcium chloride and buffer is utilized in the restoration protocol.

Hydroxyapatite obtained from columns operated using an intermittent restoration protocol (i.e., experiment 6; Table VII) had a small increase in mass and strength relative to the control protocol, indicating that the intermittent restoration protocol does not degrade the resin. Thus, the hydroxyapatite surprisingly does not require restoration after each purification procedure, which can result in savings in process time and cost.

Hydroxyapatite obtained from a column operated for 24 cycles and 1.1 column volume using the restoration protocol having a higher calcium chloride and buffer concentration in the buffered calcium solution (i.e., experiment 7, Table VIII) showed an increase in mass and particle strength compared to the control protocol. These results demonstrate that the use of a buffered calcium solution provides a significant and surprising degree of regeneration even when a high concentration of calcium chloride and buffer is utilized in the restoration protocol.

Hydroxyapatite obtained from a column operated for 5 cycles and 3 column volumes using the restoration protocol having a higher calcium chloride and buffer concentration in the buffered calcium solution (i.e., experiment 8, Table IX) showed a small gain in mass and particle strength compared to the control protocol. These results surprisingly indicate that, when the buffered calcium solution includes a high concentration of calcium chloride and buffer, fewer cycles and more column volumes of the buffered calcium solution may be utilized.

All patents, patent applications, and other published reference materials cited in this specification are hereby incorporated herein by reference in their entirety.

What is claimed is:

1. A method of treating a ceramic hydroxyapatite solid surface prior to first use in a chromatographic procedure, the method comprising:
   (a) providing a ceramic hydroxyapatite solid surface, wherein the ceramic hydroxyapatite solid surface has not been used in any chromatographic procedure and has not previously been contacted with any sample;
   (b) contacting the ceramic hydroxyapatite solid surface with a phosphate buffered solution at a pH of at least about 6.5; and then
   (c) contacting the ceramic hydroxyapatite solid surface obtained in step (b) with a solution having a hydroxide; and then
   (d) purifying protein from a sample with the ceramic hydroxyapatite solid surface obtained in step (c).

2. The method of claim 1, wherein the phosphate buffered solution is a solution having from about 0.1 M to about 1.0 M phosphate at a pH of from about 6.5 to about 10.0.

3. The method of claim 2, wherein the phosphate buffered solution is 400 mM phosphate at a pH of 8.0.

4. The method of claim 1, wherein the hydroxide is an alkaline metal hydroxide.

5. The method of claim 4, wherein the alkaline metal hydroxide is sodium or potassium hydroxide.

6. The method of claim 1, wherein the purifying of step (d) comprises contacting the ceramic hydroxyapatite solid surface with the sample, thereby separating the protein from one or more biological compounds; then
   (e) collecting the protein from the ceramic hydroxyapatite solid surface; and then
   (f) regenerating the ceramic hydroxyapatite solid surface, the regenerating comprising,
      (i) contacting the ceramic hydroxyapatite solid surface with a buffered calcium solution having a calcium ion at a concentration of at least about 5 mM and a zwitterionic buffer, wherein a ratio of zwitterionic buffer concentration to calcium ion concentration is at least about 2, and the pH of the solution is at least about 6.5;
      (ii) contacting the ceramic hydroxyapatite solid surface with a phosphate buffered solution at a pH of at least about 6.5; and
      (iii) contacting the ceramic hydroxyapatite solid surface with a solution having an hydroxide.

7. The method of claim 6, wherein (d) comprises binding the protein to the ceramic hydroxyapatite solid surface, and (e) comprises eluting the protein from the ceramic hydroxyapatite solid surface.

8. The method of claim 6, wherein (d) comprises contacting the ceramic hydroxyapatite solid surface to the protein, thereby flowing the protein through the ceramic hydroxyapatite solid surface, and (e) comprises collecting the protein in the flow through.

9. The method of claim 6, wherein the zwitterionic buffer is a sulfonic acid containing buffer.

10. The method of claim 9, wherein the sulfonic acid containing buffer is MES, PIPES, ACES, MOPSO, MOPS, BES, TES, HEPES, DIPSO, TAPS, TAPSO, POPSO, or HEPPSO, EPPS, CAPS, CAPSO, or CHES.

11. The method of claim 9, wherein the sulfonic acid containing buffer is MES.

12. The method of claim 6, wherein the calcium ion is at least about 25 mM or at least about 50 mM.

13. The method of claim 6, wherein the ratio of zwitterionic buffer concentration to calcium ion concentration is at least about 2.5.

14. The method of claim 6, wherein the buffered calcium solution comprises calcium chloride or calcium nitrate.

15. The method of claim 6, wherein the phosphate buffered solution comprises a solution containing from about 0.1 M to about 1.0 M phosphate at a pH of from about 6.5 to about 8.

16. The method of claim 15, wherein the phosphate buffered solution comprises 400 mM phosphate at a pH of 7.0.

17. The method of claim 6, wherein the regenerating step reverses or eliminates degradation of a column that occurs during protein purification or column cleaning steps.

18. The method of claim 6, wherein the regenerating step is performed before a phosphate cleaning/stripping step.

19. The method of claim 7, wherein the regenerating step is performed after elution of the protein.

20. The method of claim 6, wherein step (f) (ii) further comprises:
   contacting the ceramic hydroxyapatite solid surface with a solution comprising phosphate at a concentration of 10 mM, or less than about 10 mM, at a pH of at least about 6.5; and then contacting the ceramic hydroxyapatite solid surface with a solution comprising phosphate at a concentration of at least about 100 mM at a pH of at least about 6.5.

21. The method of claim 6, wherein the regenerating step consists of (i), a wash, (ii), and (iii).

22. The method of claim 1, wherein the protein is an antibody.

\* \* \* \* \*